May 23, 1950 F. J. SPANG 2,508,693
PROCESS AND APPARATUS FOR FORGING
CABLE TOOL DRILL BITS
Filed March 20, 1946 3 Sheets-Sheet 1

INVENTOR
Ferdinand J. Spang
By Green, McCallister & Miller
HIS ATTORNEYS

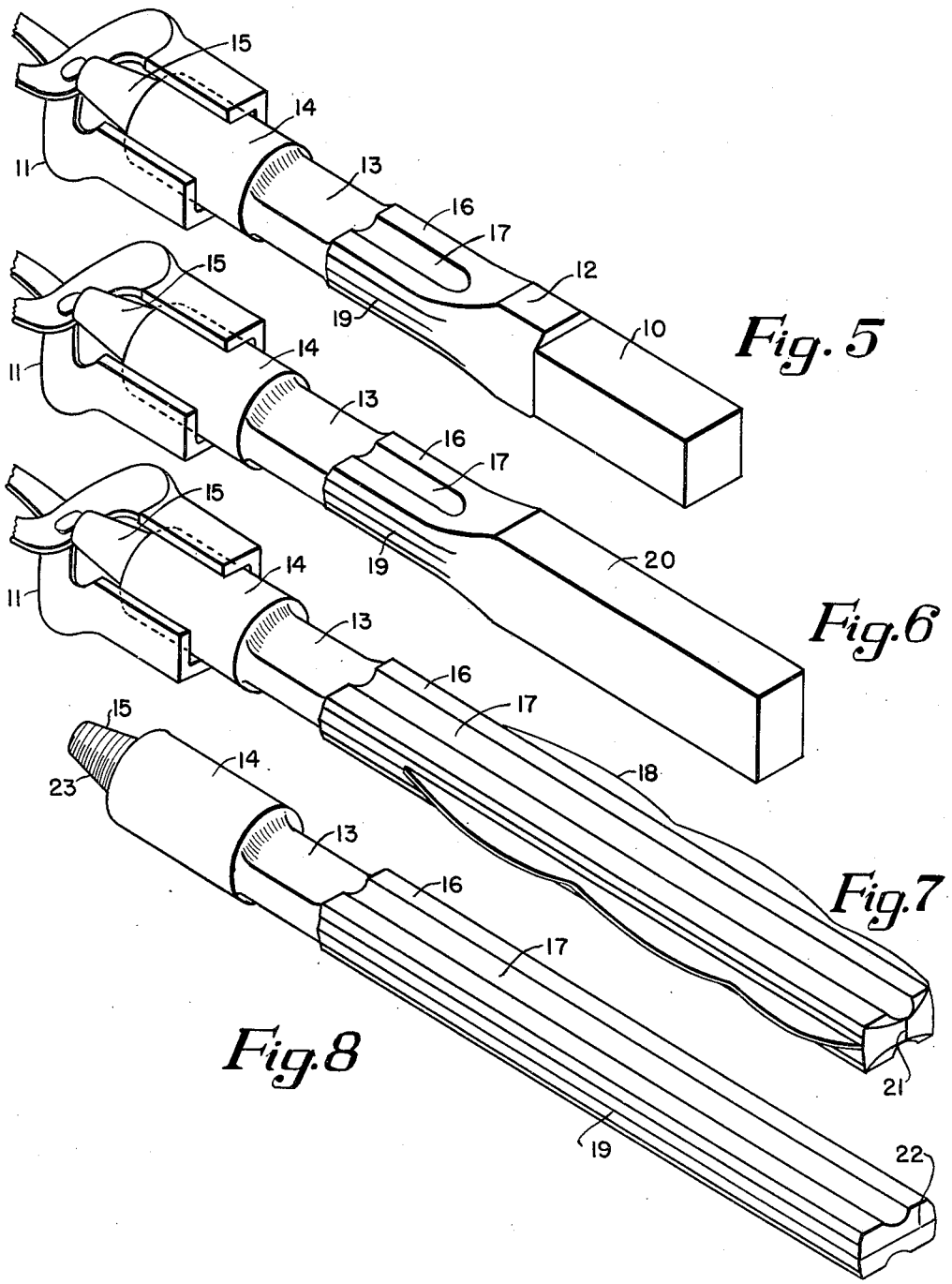

May 23, 1950  F. J. SPANG  2,508,693
PROCESS AND APPARATUS FOR FORGING
CABLE TOOL DRILL BITS
Filed March 20, 1946  3 Sheets-Sheet 3

INVENTOR
Ferdinand J. Spang
By Green, McCallister & Miller
HIS ATTORNEYS

Patented May 23, 1950

2,508,693

UNITED STATES PATENT OFFICE 2,508,693

PROCESS AND APPARATUS FOR FORGING CABLE TOOL DRILL BITS

Ferdinand J. Spang, Butler, Pa.

Application March 20, 1946, Serial No. 655,739

13 Claims. (Cl. 76—101)

1

This invention pertains to the manufacture of well drilling bits and more particularly to procedure and apparatus suitable for drop hammer forging of steel drill bits such as used in cable tool or percussion drilling. That is, the present invention deals principally with procedure for forging drill bits as distinguished from a rolling procedure.

Percussion drill bits such as used in the oil fields comprise a body member or length having a shank which is generally composed of a connector pin and a collar. The shank or the pin collar thereof ordinarily terminates in a wrench flat portion that is connected to the main cutting body or portion of the member. Thus, broadly speaking, the shank may be said to also include the wrench flat portion. The main body portion includes lengthwise extending water courses along substantially planar opposite faces thereof that represent a major transverse axis of the body portion. It also includes cutting portions that are somewhat beveled and extend lengthwise along somewhat convex opposite faces that represent a minor transverse axis of the body portion. It will be apparent that the cutter blade or drill portion of the bit approximates a block letter H in section; this portion has slightly convex shaped cutter surfaces that are connected by relatively thin concave bridge walls which define water courses.

The bits used for drilling purposes in the oil fields are of rather heavy construction, varying in weight from approximately 200 to over 4000 pounds. Drill bits of the percussion type are of rather massive construction and are subject in use to severe treatment. It is thus essential that they have a uniform metallic structure in order that they will wear evenly and remain intact throughout their useful life, which will involve a considerable wearing away of the material at the end of the bit in the active operation. In my Patent #2,216,462 of October 1, 1940, I have shown a procedure for obtaining uniformity of structure, particularly from the standpoint of the cutter portion of the bit. In accordance with the procedure set forth, laps and cold shuts have been eliminated. The present improved procedure provides a substantially uniform metallic structure along the full length of the bit, which includes the shank and wrench flat portions thereof. That is, in accordance with the present procedure, the full length of a piece is forged in such a manner that the resulting grain structure of the piece closely approximates that of a rolled piece.

2

And, it has been an object of the present invention to provide new and improved forging procedure and to provide apparatus for carrying out such procedure in the manufacture of percussion drill bits.

Another object of my invention is to produce a procedure for forming drill bits which involves die forging the bit from end to end.

A further and more specific object is to produce a procedure for forging drill bits in which the entire structure of the bit is formed by a die forging operation and one end thereof is completed by such an operation before the die forging operation is started on the other end.

A further object of my invention has been to provide a drill bit having improved strength and wearing characteristics.

A still further object is to provide a procedure for completing a drill bit by a drop forging operation so modified as to closely approximate a rolling procedure from the standpoint of its application to the metal of the bit and the effect thereof on the grain structure of the bit.

These and other objects of my invention will appear to those skilled in the art from the description of the embodiment chosen for the purpose of illustration, as well as from the claims.

In the drawings,

Figure 5 is a similar view after the blank or piece has been reversed in the tongs for forming the other end section.

Figure 6 is a similar view after the reversed end has been block-forged.

Figure 7 is a similar view after the piece has been successively and progressively die-forged from its intermediate portion to the cutting end of the other end section thereof.

Figure 8 is a similar view of a completed percussion bit after the selvage and flash have been removed and the pin has been threaded.

As shown particularly in Figures 1 to 8, inclusive, I may start with a substantially square steel billet 10 which may be held at one end by a pair of tongs 11 during subsequent operations. I then block forge and die-forge one end section of the blank, reverse the blank and block and die-forge the other end section thereof with a slight overlap, and thereby provide a drill bit of improved strength and wear resisting characteristics and of continuous and uniform internal structure. All these operations are accomplished while the blank is at suitable forging temperature.

Figure 1:
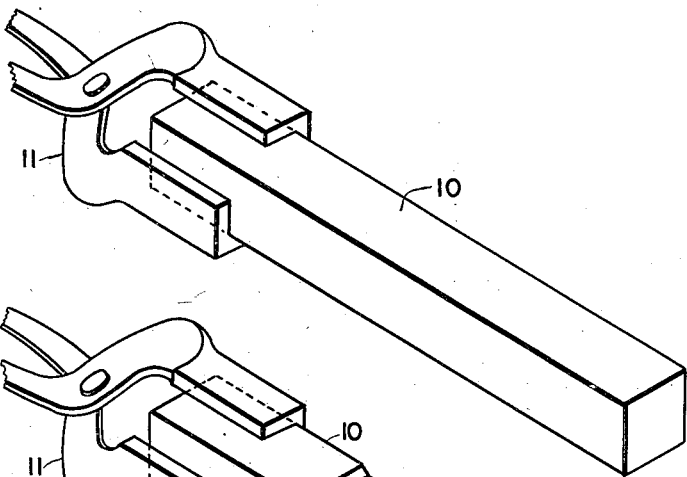
Figure 1 is a perspective side view of a billet from which the bit is to be forged.
Figure 2:
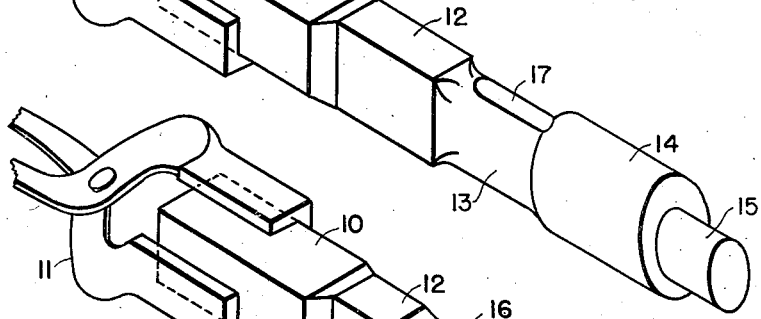
Figure 2 is a similar view of the billet with an end section block-formed.

Referring to Figure 2 of the drawings, the billet 10 is rough forged at an end section thereof to approximate the ultimate desired shape. That is, I roughly produce a shank having a pin 15 and a collar 14, a wrench flat 13, and may also produce an approximation of the beginning of the water course as shown at 17, which are connected by a rectangular portion 12 to the main body of the blank 10. In this operation such end section of the blank is elongated, see Figure 2, to produce a somewhat rectangular-oval blank corresponding roughly to the ultimate shape of such portions of a bit.

Figure 3:
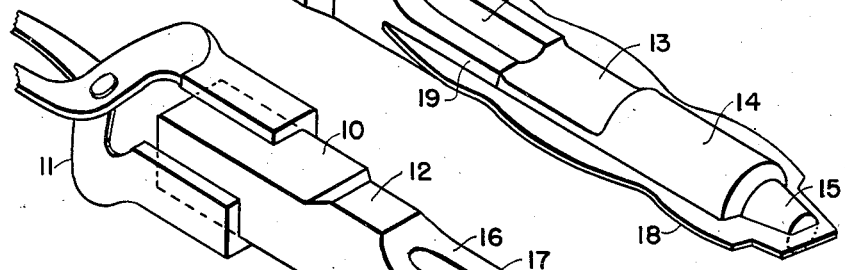
Figure 3 is a similar view after the first die forging operation has been performed on the blank.

In the next step, as indicated in Figure 3, I die-forge the thus roughly shaped portion of the blank in such a manner as to reverse the major and minor transverse axes thereof and to further elongate it. In this operation, the wrench flat 13 is completed. A portion of the rectangular section 12 is formed into what may be termed the beginning or upper end portion 16 of the cutter blade. That is, I form water courses 17 that, as shown, are substantially fully open to the wrench flat part 13, the convex cutter face or blade portions 19 and flash 18 extends longitudinally thereof. It will appear that the beginning segment 16 of the cutter blade part is located intermediate the ends of the metal blank. In Figures 9, 10 and 11 and 12 I have shown dies which may be utilized in this connection and which will be described in more detail later.

Figure 4:
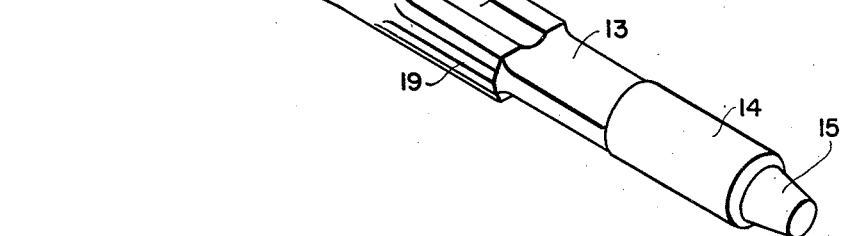
Figure 4 is a similar view after flash has been removed.

The flash 18 is then removed by placing the previously formed end of the blank on a box 35 having trimming knives 36 adjacent upper edges thereof which are spaced apart a distance substantially equal to the width of the section of blank from which the flash is to be trimmed. For example, the knives 36 extend parallel for a portion of their length and converge at one end to the shape of the pin 15. When the formed end of the blank is in position a pusher block 37 is moved into contact with the upper face thereof to press it between the trimming knives and shear the flash 18 therefrom. After the flash has been removed, the blank appears as shown in Figure 4. The blank is then reversed, see Figure 5, and is held at its previously formed end by tongs 11.

Figure 14:
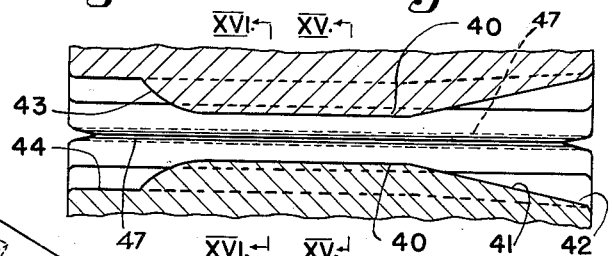
Figure 14 is a view similar to Figure 9, but showing a pair of dies for forging the cutter portion of the bit in a closed relationship.

In the next operation, the blank is block-forged at its end 10 into a rectangular shape 20 whose major and minor transverse axes are at right angles to the major and minor transverse axes of such previously formed portions as 13 and 16. The blank is then successively draw-die forged from the cutter-beginning portion 16 of the first forged end section towards the end of the second end section to produce continuously extending water courses 17, cutter face portions 19, and flash 18 which extend longitudinally thereof. It will be noted that the major and minor axes of the blank are changed at right angles to their position in rectangular shape 20 and that the water courses are located on faces that represent or extend substantially parallel to the major transverse axis of the cutter blade body. The end of the blank has a selvage 21 which is removed together with the flash 18 to produce a completed bit cutting end 22, as shown in Figure 8. In this die-forging operation, I contemplate employing dies such as shown in Figure 14 of the drawings. To finally complete the blank, as shown in Figure 8, I thread the pin end 15 in the usual manner, as indicated at 23.

Referring particularly to the dies of Figures 9 to 12, inclusive, it will be seen that they consist of upper and lower die portions, each of which is provided with dovetailed portions 45 by means of which it may be attached to parts of a suitable hammer. Each of the die sections or halves is relatively long and exactly alike in shape or size, and each has die cavities 25, 28, 29, 30 and 31 therein for shaping the blank from the form shown in Figure 2 to the form shown in Figure 3. I have indicated passageways 26 and flash-receiving slots 27 at one end of the dies which extend transversely thereof, and side flash forming passageways 26a and receiving slots 27a which extend longitudinally of the dies, see Figures 10, 11 and 12. The transverse flash-receiving slots 27 limit the longitudinal flow of the metal at the pin end 15 of the drill bit member.

Figure 9:
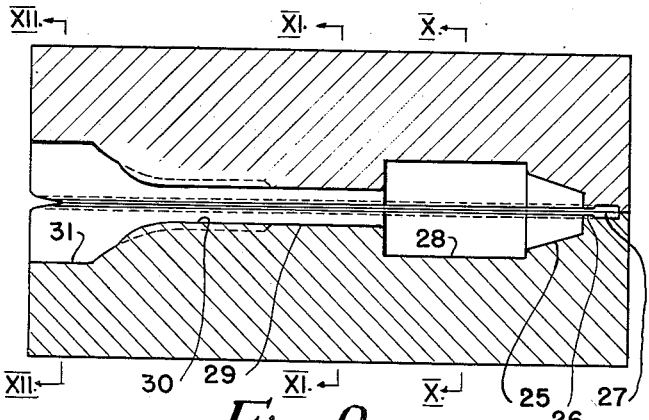
Figure 9 is a longitudinal side section of a pair of dies in a closed relationship through the throat formed thereby for effecting the die-forging operation of Figure 3.
Figure 10:
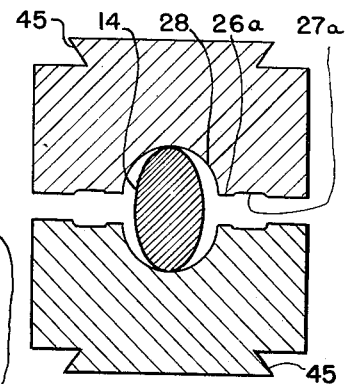
Figures 10, 11 and 12 are transverse sectional views taken along the lines X, XI and XII of Figure 9.
Figure 11:
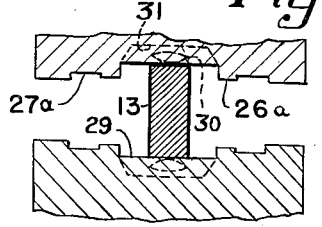
Figure 12:
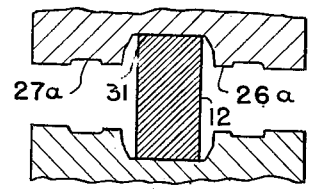
Figure 15:
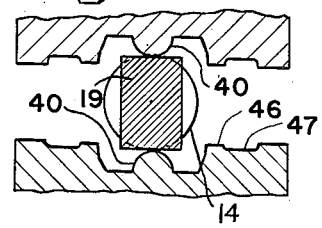
Figure 15 is a transverse section taken along the line XV—XV of Figure 14 and showing the piece in position ready for forging.
Figure 16:
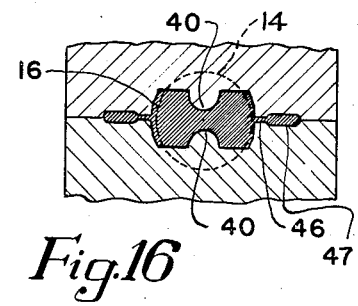
Figure 16 is a similar section, but showing the dies in a closed relationship after the piece has been die-forged.

Referring particularly to the dies of Figures 14 to 16, inclusive, it is apparent that they substantially correspond to the dies shown in my above-mentioned patent, and like the dies of Figure 9, are designed to permit the formation of flash intermediate of and along longitudinal edges of the blank. The first blow of the upper die on the blank causes fuller portions 40 of each die to be driven partially into the blank with the result that the top and bottom faces are slightly concaved and the blank flattened to such an extent that the corners thereof come into contact with transverse surfaces of the dies. Metal is caused to flow outward into contact with surfaces 44 of the dies during the operation. The water courses 17 are formed by the tapered ends 41 of the fullers. All portions of the fullers 40 are formed on substantially the same radius, and as a result the front end 43 of the form is sphere-like in shape, and tapered end 41 slopes in all directions longitudinally. The walls of the opposed die halves are flared at their rear ends to form an opening 42 which admits the blade portion of the blank without subjecting it to reworking. As repeated blows are struck, the sides of the blank are bulged out and the metal is moved to fully fill the die transversely and metal is caused to flow outwardly through the passageways 46 into flash-receiving slots 47. It is apparent that as the dies approach closer and closer together, the excess metal of the blank must flow longitudinally from the inner portion of the blank towards the outer end with the smaller portion of the metal overflowing to form a seal in the form of flash 18, thus confining the major portion of the side walls of the blank within the die cavity. As pointed out above, flash is formed in the pockets or slots 46 and 47. Employing such a pair of dies, the water courses and the cutting surfaces are formed on the blade portion and the blank of the end section is advanced progressively along these dies with a slight overlap between each operation until it is completely formed.

Figure 13:
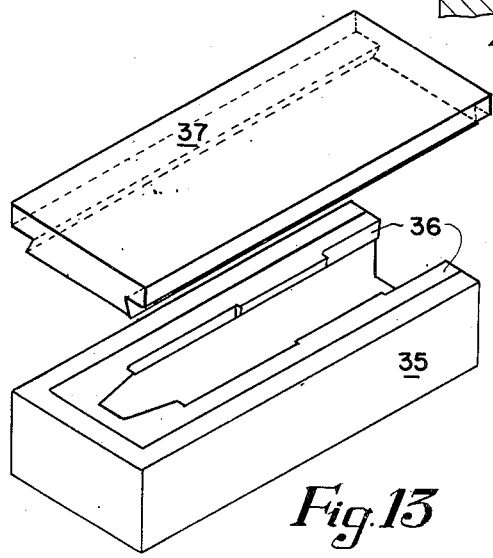
Figure 13 is a perspective view in side elevation of a device for shearing the flash from the bit.

Flash 18 formed along the cutter blade portion of the bit member is removed by a device (not shown) that is similar to the device of Figure 13, except that the knives 36 extend parallel along their lengths in a spaced relationship corresponding to the length of the major transverse axis of such portion of the bit.

In carrying out my invention, I prefer to use a blank, billet, or initial blank which will, when forged and elongated, correspond to the desired length of the drill bit piece. That is, the billet may be less than one-third the length of the ultimate shape. The longitudinal flow of the metal, in accordance with my procedure, begins from an intermediate portion of the piece outwardly towards each end thereof, thus producing an exceptionally strong drill bit member. Although I prefer to form the shank and wrench flat portions first, my procedure may be reversed and the cutter portion, see the steps of Figures 5 to 7, inclusive, may be first formed and the steps of Figures 2 to 4, inclusive, subsequently effected.

It will be noted that in the die-forging operation of Figure 3, the intermediate flash 18 which extends along the sides of the blank and transversely across the pin end part 15 will cool more quickly than the main body, and thus limit metal flow transversely of the blank and towards the pin end thereof. That is, the greater flow is longitudinally of the blank towards the intermediate portion thereof. In the die-forging of Figure 7, the major flow is longitudinally of the blank towards the end 21 of the cutter blade part, due to the fact that the progressive die-forging of the cutter blade part starts from the intermediate or beginning segment 16 of that part and continues towards the other end 21 of the blank to substantially complete the finished well-drilling bit.

Although for the purpose of illustrating my invention I have shown a particular embodiment thereof, it is apparent that various modifications, adaptations and additions may be made without departing from the spirit and scope thereof as indicated in the appended claims.

What I claim is as follows:

1. A method of forming a percussion well-drilling bit to provide a bit having an improved metallic structure along its shank and cutter parts which comprises; providing a rectangular metal blank having a greater cross-sectional area and lesser length than a finished bit to be formed therefrom, heating the blank to a forging temperature, die-forging the blank intermediate its ends to form a segment of a substantially finished cutter blade part with water courses therealong; and, forming a substantially finished bit, by die-forging a shank part from and open to the water courses of the intermediate cutter blade segment towards one end of the blank, and by progressively die-forging a cutter blade part with water courses therealong from the intermediate cutter blade segment towards the other end of the blank; said die-forging operations being effected in such a manner as to reduce major transverse axes of the blank and to substantially elongate and shape the blank to the final dimensions of the finished bit.

2. A method as defined in claim 1, wherein the shank part is first die-forged towards one end of the blank before the cutter blade part is progressively die-forged.

3. A method as defined in claim 1, wherein the shank part and the segment of the cutter blade part are simultaneously formed by the same die-forging operation.

4. A method of forming a percussion well-drilling bit to provide a finished bit having an improved metallic structure along its shank and cutter parts which comprises; providing a substantially rectangular preliminarily-formed metal blank having major transverse axes and a greater cross-sectional area and lesser length than the finished bit to be formed therefrom; providing the blank with a forging temperature; die-forging the blank intermediate its ends to form a segment of a substantially finished cutter blade part with water courses therealong; and, forming a substantially finished drill bit, by die-forging a shank from and open to the water courses of the intermediate segment of the cutter blade part to one end of the blank, and by progressively die-forging a substantially finished cutter blade part having water courses therealong by overlapping operations that are advanced from the intermediate segment of the cutter blade part to the other end of the blank; said die-forging operations being effected in such a manner as to reduce and reverse major transverse axes of the blank and to elongate and shape the blank to substantially the final dimensions and the contour of the finished bit.

5. A method of forming a percussion well-drilling bit having a substantially uniform metallic structure along its full length which comprises; providing a substantially rectangular metal blank of greater cross-sectional area and lesser length than a finished bit to be formed therefrom, heating the blank to a forging temperature; preliminarily forging the blank from intermediate its ends to one end thereof to a form such that the thus-forged portion of the blank is provided with major transverse axes that extend substantially at right angles to the direction of major transverse axes of the finished bit; die-forging the thus preliminarily forged portion of the blank into a substantially finished shank part and a beginning segment of a cutter blade part of the bit, while reversing the major transverse axes of such preliminarily forged portion of the blank; preliminarily forging the blank from the beginning segment of the cutter blade part to the other end thereof to a form such that a major transverse axis of the thus-forged portion of the blank extends substantially at right angles to the direction of the major transverse axis of a corresponding portion of the finished bit; and forming a substantially finished cutter blade part from the last-mentioned preliminarily forged portion of the blank by overlapping die-forging operations that progress from the previously formed segment of the cutter blade part of the first-mentioned portion of the blank in such a manner that a major transverse axis of the cutter blade part thus die-formed extends substantially at right angles to the direction of the major transverse axis of the corresponding second-mentioned preliminarily-formed portion of the blank.

6. A method of forming a percussion well-drilling bit to provide a bit having a substantially uniform metallic structure along its full length which comprises, providing a substantially rectangular metal blank of greater cross-sectional area and lesser length than a finished bit to be formed therefrom; heating the blank to a forging temperature; initiating the formation, respectively from one end of and to a point somewhat intermediate the length of said blank, of pin end, collar and wrench flat parts, and a beginning segment of a cutter blade part of the bit by block-forging such end portion of the blank; die-forging such initially formed parts to a substantially finished cross-sectional form representing such parts in such a manner that major transverse axes of the thus die-forged parts extend substantially at right angles to the direction of major transverse axes of corresponding parts of the previously block-forged end portion of the blank, while forming thereon an intermediate flash which extends longitudinally along each side of such end portion and transversely across the pin end part thereof, and while causing the metal of the die-forged portion of the blank to flow longitudinally of the blank from the pin end part thereof; trimming the flash so formed; initiating the formation of a substantially complete cutter blade part of the bit by block-forging the other end portion of the blank to a form having a major transverse axis extending in a direction at right angles to the direction of the major transverse axis of a corresponding portion of the finished bit; die-forging the last-mentioned block-forged end portion of said blank to a substantially finished cutter blade cross-sectional form such that the major transverse axis of the thus die-forged end portion thereof extends substantially at right angles to the direction of the major transverse axis of the corresponding part of the previously block-forged last-mentioned end portion of the blank, by overlapping die-forging operations that start from the previously-formed segment of the cutter blade part of the first-mentioned end portion of the blank and that continue substantially to the end of the last-mentioned end portion of the blank, while forming thereon an intermediate flash which extends longitudinally along each side of the last-mentioned end portion of the blank, and while causing the metal of the thus die-forged last-mentioned end portion of the blank to flow longitudinally thereof; and, trimming the flash so formed.

7. A method as defined in claim 6, wherein the second-mentioned end portion of said blank is held while the first-mentioned end portion is being forged, and the blank is reversed and the pin end part of said first-mentioned end portion is held while the second-mentioned end portion is being forged.

8. A method as defined in claim 6, wherein the die-forging operation on the first-mentioned end portion is effected in such a manner as to provide water courses along the segment of the cutter blade part, and the die-forging operations on the second-mentioned end portion are effected in such a manner as to provide continuous water courses from the water courses of the segment of the cutter blade part of the first-mentioned end portion.

9. In a method of forging a metal blank into a percussion well-drilling bit member having connected cutter blade and wrench flat parts of improved metallic structure, the steps of providing a metal blank of substantially shorter length and greater cross-sectional area than the finished bit to be formed therefrom, providing the blank with a suitable forging temperature while die forging a wrench flat part and the beginning of a cutter blade part having water courses substantially open to the wrench flat part and, successively die forging a full cutter blade part with water courses by overlapping operations from the previously forged beginning of the cutter blade part.

10. In a method of forging a metal blank to provide a percussion well drilling bit of substantially uniform metallic structure along its length, the steps of providing a metal blank of greater cross-sectional area and lesser length than a finished bit to be formed therefrom, maintaining the blank at forging temperature while block forging one end section thereof into a length somewhat corresponding to the desired ultimate shape of the bit and having a major transverse axis that extends in a direction substantially at right angles to the direction of a major transverse axis of the corresponding end section of the finished bit, die forging said end section into substantially the ultimate desired shape of the bit and having a major transverse axis at right angles to the corresponding transverse axis of the previously block forged end section of the blank, block forging the other end section of the blank into a shape roughly corresponding to the desired ultimate shape of the bit and having a transverse axis that extends in a direction substantially at right angles to the direction of a major transverse axis of the corresponding end section of the finished bit, and die forging the second-mentioned end section to substantially the ultimate desired shape and dimensions of the finished bit, such shape having a major transverse axis at right angles to the corresponding transverse axis of the second-mentioned block forged end section of the blank; the die-forging of one of the end sections being effected in such a manner as to provide the beginning of a substantially finished cutter blade part with water courses that is located substantially intermediate of opposite ends of the blank, and to provide a substantially finished wrench flat part adjacent thereto and to which its water courses are open; and, the die forging of the other end section being effected by overlapping operations that are started from the beginning of the cutter blade part and that continue along such other end section to form a substantially complete and finished cutter blade part having continuous water courses along.

11. In a method of forging a metal blank to provide a percussion well drilling bit of substantially uniform metallic structure along its length, the steps of providing a metal blank of greater cross sectional area and lesser length than a finished bit to be formed therefrom, maintaining the blank at a forging temperature while block forging an end section thereof into a rectangular-oval shape portion corresponding to preliminary pin, collar, wrench flat parts and the beginning of a cutter blade part of the finished bit; die forging the rectangular-oval shaped portion into conic, rounded and flat portions corresponding to substantially finished pin, collar, and wrench flat parts and the beginning of a cutter blade part with water courses of the bit, such that major transverse axes of the substantially finished parts extend in a direction at right angles to the direction of major transverse axes of the preliminary parts; reversing the blank, block forging the other sectional end thereof into a rectangular shape having a major transverse axis at right angles to a major transverse axis of the substantially finished beginning of the cutter blade part of the bit, and progressively and successively die forging the second-mentioned end section from the beginning of the cutter part and its water courses to the end of the second-mentioned section of the blank to form a substantially finished cutter blade part having water courses extending longitudinally along its opposite faces that represent a major transverse axis of the cutter part and with cutter edges extending longitudinally along convex faces that represent a transverse minor axis of the cutter blade, said last-mentioned die forging being effected in such a manner that the major transverse axis of the substantially finished cutter blade part extends in a direction at right angles to the major transverse axis of the corresponding previously block-forged end section of the blank.

12. A percussion well-drilling bit of substantially uniform metallic characteristics along its length having integrally connected die-forged, pin, wrench flat and blade parts therealong, said blade part having walls defining water course depressions extending longitudinally along said blade part from a cutter end thereof to said wrench flat part, said water course depressions being fully open at their longitudinal ends to said wrench flat part and to a cutting end of said blade part, and said water course depressions being of substantially uniform transverse width along the length of said cutter blade part and being at their open ends of at least as great a width as along the length of said cutter part.

13. A pair of opposed die blocks for simultaneously die-forging pin, collar and wrench flat parts, and a segment of a cutter blade part along one end of a longitudinal metal block to form a percussion well-drilling bit; one of said die blocks being adapted to be mounted on a hammer and the other being adapted to be mounted on an anvil; an opposite face of each die block having a die cavity open to one end thereof, extending longitudinally therealong, and closed to the other end thereof; longitudinal passageways along opposite sides of the die cavity of each die block and open transversely thereto; longitudinal flash-receiving slots of greater depth than the longitudinal passageways, along outer sides of the longitudinal passageways, and open transversely thereto; the die cavity of each die block terminating in a semi-conical wall portion at the closed end thereof; a transverse passageway along a converging end of said semi-conical wall portion and open longitudinally thereto; a transverse flash-receiving slot of greater depth than the transverse passageway, along said transverse passageway, and longitudinally open thereto; and, each die cavity being constructed to define half of a complete die cavity for the metal blank.

FERDINAND J. SPANG.

REFERENCES CITED

The following references are of record in the file of this patent:

UNITED STATES PATENTS

| Number | Name | Date |
| --- | --- | --- |
| 435,855 | O'Leary | Sept. 2, 1890 |
| 758,041 | Barclay | Apr. 26, 1904 |
| 879,631 | Gregson | Feb. 18, 1908 |
| 1,474,516 | Eicher | Nov. 20, 1923 |
| 1,680,327 | Eicher | Aug. 14, 1928 |
| 2,216,462 | Spang | Oct. 1, 1940 |